Nov. 15, 1960 H. VAN DER HEIDE 2,960,685

MAGNETIC SWITCHING DEVICE

Filed Aug. 17, 1955 3 Sheets-Sheet 1

INVENTOR
HENDRIK VAN DER HEIDE
BY Fred M Vogel
AGENT

INVENTOR
HENDRIK VAN DER HEIDE
BY [signature]
AGENT

Nov. 15, 1960 H. VAN DER HEIDE 2,960,685

MAGNETIC SWITCHING DEVICE

Filed Aug. 17, 1955 3 Sheets-Sheet 3

INVENTOR
HENDRIK VAN DER HEIDE

BY Fred M Vogel
AGENT 2,960,685

MAGNETIC SWITCHING DEVICE

Hendrik van der Heide, Eindhoven, Netherlands, assignor, by mesne assignments, to North American Philips Company, Inc., New York, N.Y., a corporation of Delaware Filed Aug. 17, 1955, Ser. No. 528,982

Claims priority, application Netherlands Aug. 19, 1954

7 Claims. (Cl. 340—174)

This invention concerns devices comprising a closed, effectually small, magnetic circuit. Small magnetic circuits are, for example, used in static magnetic trigger circuits. The ferromagnetic material from which the magnetic circuit of such trigger arrangements is made has a high remanence and a hysteresis loop approximately in the form of a parallelogram. As is known such trigger circuits are inter alia used for recording coded intelligence which is stored by the state of remanence of the ferromagnetic material. By means of current pulses supplied through one or more input windings coupled with the magnetic circuit a given state of remanence, corresponding to "0" or "1" of the coded intelligence is set, for example "0" is characterized by positive remanence and "1" by negative remanence. The reading out of the intelligence is effected by measuring the voltage set up across an output winding which is associated with the magnetic circuit, under the influence of a next following impulse appearing in said input windings.

In known trigger circuits the magnetic circuits comprise ring-shaped cores. However, in order to reduce the power of the current pulses, which is required for operating the trigger circuit, and avoid excessive limitation of the maximum repetition frequency of said pulses the annular cores should have a small size. As a result the cores are difficult to handle and, moreover, extremely fragile, which disadvantage is particularly of importance in memory matrices comprising a considerable number of such cores.

The present invention has for its object to meet this disadvantage and is characterized in that the magnetic circuit of the device comprises at least two separated plate-shaped parts of ferromagnetic material, each furnished with a hole through which the input windings, which may consist of single conductors, are provided in series and the output windings, which may likewise consist of single conductors, are connected in series- or in parallel-opposition, the size of the holes and the number of windings through each hole being so chosen, in accordance with the materials used, that a desired part of the voltages, set up by the fluxes produced in one plate under the influence of currents passing through the input windings, is compensated in the output windings by the voltages produced by the fluxes in the other plates.

In order that the invention may be readily carried into effect it will now be described with reference to the accompanying drawings, given by way of example, in which Fig. 1 shows a device in accordance with the invention.

Fig. 2 shows the equivalent known construction of a similar device.

Fig. 3*a* shows a hysteresis loop of the devices of Figs. 1 and 2.

Fig. 3*b* shows the hysteresis loop of the correcting section of the device shown in Fig. 4.

Fig. 4 also shows a device according to the invention.

Fig. 5 shows a known device for switching purposes.

Fig. 6*a* shows the hysteresis loop of the device shown in Fig. 5.

Fig. 6*b* shows the hysteresis loop of a portion of the device shown in Fig. 7.

Fig. 6*c* shows the hysteresis loop of the complete device shown in Fig. 7.

Figure 1:
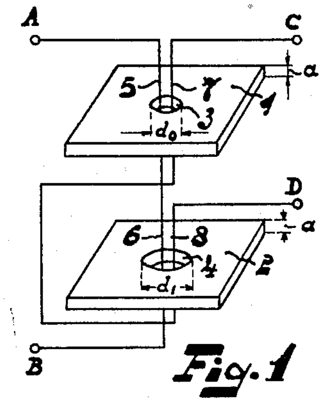

In the device in accordance with the invention shown in Fig. 1, the reference numerals 1 and 2 denote two plates of ferro-magnetic material having the same thickness $a$. Plate 1 is provided with a hole 3 and plate 2 with a hole 4 whose cross-sectional area exceeds that of hole 3. Primary windings 5 and 6, in the case under review single conductors, are connected in series between input terminals A and B, secondary windings 7, 8 also in the form of single conductors being connected in series-opposition between the output terminals C and D. Alternatively, however, the windings 7 and 8 may be connected in parallel-opposition with the same result.

A current supplied to the input terminals A and B will produce magnetic fluxes in both plate 1 and plate 2 which, if the cross-sectional area $d_0$ of hole 3 were equal to the cross-sectional area $d_1$ of hole 4, would be equal but opposite, which might give rise to voltages across the windings 7 and 8, which would likewise be equal but opposite. However, $d_1$ exceeds $d_0$, so that only those voltage contributions across the winding 7, produced under the influence of fluxes in plate 1 at a distance in excess of $\frac{1}{2}d_1$ from the conductor 5, are compensated by voltages across the winding 8 produced under the influence of fluxes in plate 2. At the terminals C and D a voltage is consequently set up, which is only caused by the fluxes in the plate 1 in an annular area thereof, of which area the inside diameter is $d_0$ and the outside area is $d_1$.

Figure 2:
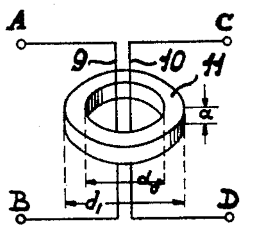

Consequently the device shown in Fig. 1 electrically corresponds to a device comprising a ferromagnetic circuit 11 with a thickness $a$, an inside diameter $d_0$, an outside diameter $d_1$, an input winding 9 and an output winding 10, vide Fig. 2.

It will be obvious that a device comprising an equivalent circuit as shown in Fig. 2 is likewise obtained by using for plate 2 a material different from that of which plate 1 is made. In this instance however, the dimension $a$ of plate 2, the cross-sectional area $d_1$ of hole 4 or the number of turns of winding 6 or 8 should be different than in the case of Fig. 1.

By a suitable choice of the material, dimensions and numbers of turns, it is even possible to obtain a magnetic circuit which, in given cases, may have better properties, than has the magnetic circuit comprising a ring core.

Figure 3A:
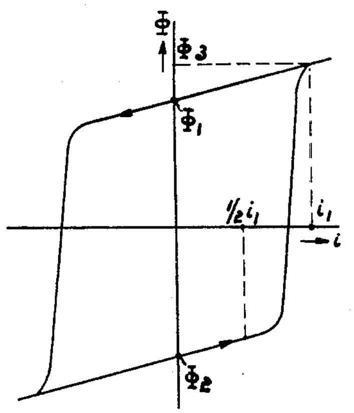

Assume, for example, the device shown in Fig. 2 to be intended as a static, magnetic trigger circuit or memory-type switch, and the magnetic circuit 11 to have a high remanence and a hysteresis loop substantially in the form of a parallelogram. Fig. 3*a* shows such hysteresis loop where the flux $\phi$ is plotted as a function of the current $i$ passed through the winding 9. If $i=0$ there are two states of remanence viz. polarisation state $\phi_1$, and polarisation state $\phi_2$. The state $\phi_1$ corresponds, for example to "0" and $\phi_2$ corresponds to "1" of the coded intelligence. Let the circuit be in the state $\phi_1$, then a positive current pulse having a value $i_1$ and supplied to terminals A and B will produce flux variations $\phi_3-\phi_1$ and $\phi_1-\phi_3$ in the core, which produce voltages across the terminals C and D of winding 10. If the circuit is in the state $\phi_2$ a positive pulse supplied to the terminals A and B with a leading edge of said pulse will produce a flux variation $\phi_3-\phi_2$ and, with a trailing edge, a flux variation $\phi_1-\phi_3$. These variations will also produce voltages across the terminals C and D of winding 10 of which voltages the first peak, which occurs with a leading edge of the pulse, is considerably larger than the first peak which appears in the state $\phi_1$ of the circuit. In this respect it is pointed out that the said pulse value, that is to say $i_1$, the circuit invariably reaches the state $\phi_1$ after supplying the pulse to the terminals A and B which state consequently correspondence "0" of the coded intelligence. The storing of a memory element "1," that is to say that the circuit is caused to assume the state $\phi_2$, is effected by supplying to the terminals A and B a negative pulse whose absolute value is at least equal to $i_1$.

The difference between a "0" and a "1" of coded intelligence is consequently based on the difference between the voltage peaks across winding 10, which difference is due to the difference in flux variations $\phi_3-\phi_1$ and $\phi_3-\phi_2$. In practice, this voltage difference generally proves small which is to be ascribed to the fact that the hysteresis loop is not sufficiently flat near remanence.

Substituting in accordance with the invention, the device shown in Fig. 1 for the device shown in Fig. 2 the former has the same properties as the latter.

Figure 4:
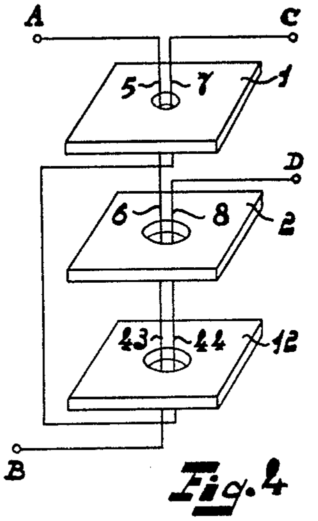
Figure 3B:
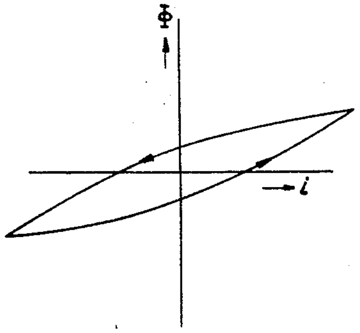

It has now been found that the effective hysteresis loop of the device shown in Fig. 1 can be made flat near remanence, for example by adding to plate 2 a third plate 12 (Fig. 4) having such properties as to exactly compensate the undesired flux variations $\phi_1-\phi_3$ by compensating flux variations in said plate 12. Since this plate 12 is used to exert a correcting effect, when the effective hysteresis loop of the magnetic circuit comprising the combination of plates 1 and 2 is not sufficiently flat, the hysteresis loop of plate 12 should have a comparatively low remanence, while the slope of said hysteresis loop near remanence should practically be equal to the slope of the hysteresis loop near remanence of the magnetic circuit comprising the plates 1 and 2. This is true when the number of turns of the windings 43 and 44 is equal to the number of turns of the windings 5, 6 and 7, 8. Such a correcting hysteresis loop is depicted in Fig. 3*b*. If, however, said slopes are not equal a suitable choice of the number of turns of windings 43 and 44 yet permits undesired voltage peaks due to undesired flux variations $\phi_1-\phi_3$ to be compensated by voltage peaks appearing under the influence of flux variations in plate 12.

It is found that if plate 12 is made from the same material as that of plates 1 and 2, that is to say from a material which, when used for an annular core, has a high remanence and a hysteresis loop in the form of a parallelogram, a magnetic circuit comprising such a plate with a hole has a hysteresis loop with the exactly desired comparatively low remanence.

Instead of using a third plate 12 such compensation can also be obtained by making plate 2 shown in Fig. 1 sufficiently thick i.e. in excess of *a*.

Figure 5:
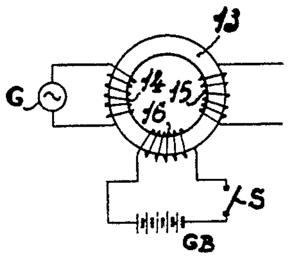

Fig. 5 shows a known device which may be used for switching purposes. G stands for an A.C. supply, 13 denotes a core having a high remanence and a hysteresis loop in the form of a parallelogram, 14 denotes an input winding, 15 an output winding, 16 a control winding, GB represents a D.C. supply and S a switch.

Figures 6A, 6B, 6C, 7:
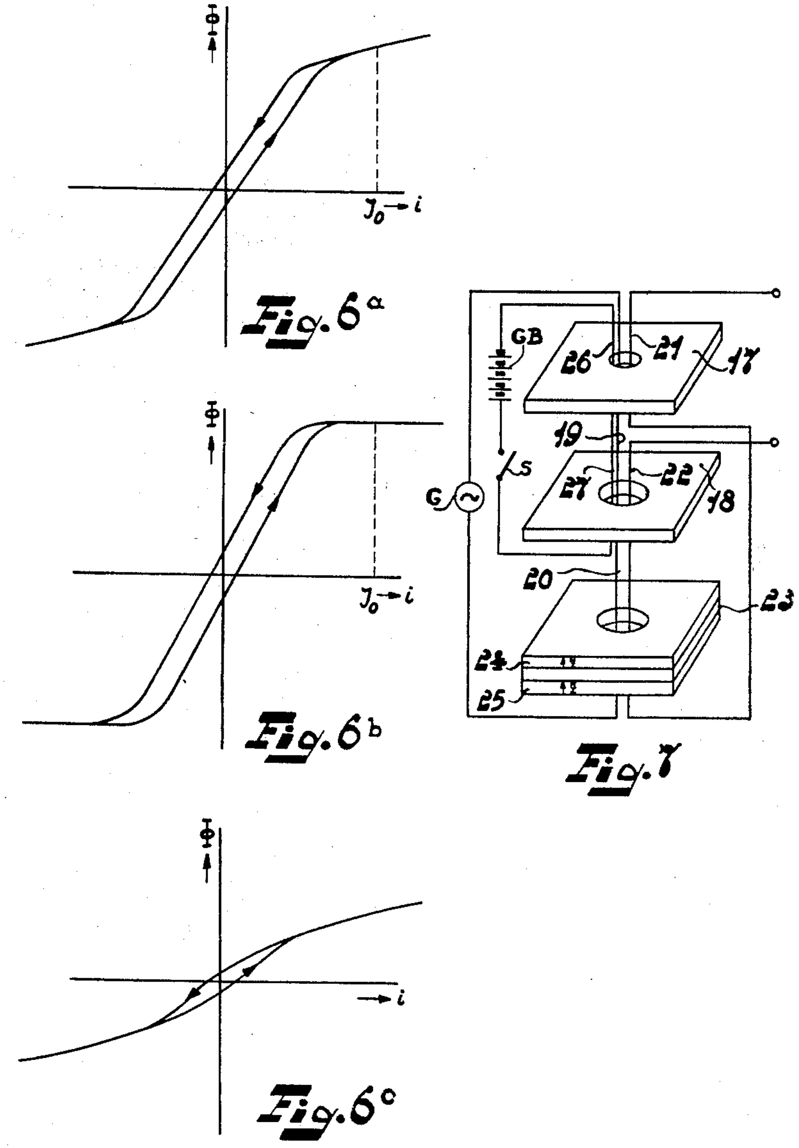
Fig. 7 shows a device in accordance with the invention for switching purposes.

Fig. 6*a* shows the characteristic used in such devices. With open switch S the device acts as a transformer and as a result of the steep characteristic the voltage across the output winding may be considerable. If, however, the switch is closed, the core becomes saturated by the setting current $I_0$ supplied by GB and the flux variations then occurring under the influence of the alternating current supplied by G are only small.

Fig. 7 shows an analogous device in accordance with the invention. Two plates 17, 18 are substituted for the core 13 and the windings 14, 15, 16 have been replaced by input windings 19, 20 connected in series, by output windings 21, 22 in series-opposition and by series-connected control-windings 26, 27 respectively. By making the plates 17, 18 from the same material as the core 13, choosing the thickness of the plates equal to that of core 13 and by making the diameters of the holes of plate 17, 18 equal to the inside and outside diameter of core 13 the magnetic circuit obtained is equivalent to core 13 in respect of the effective hysteresis loop.

With switch S closed the flux variations are preferably zero. To this end the characteristic of the hysteresis loop shown in Fig. 6*a* should be flat near saturation. With the use of a correcting plate, analogous to the use of plate 12 in the device shown in Fig. 4, the effective hysteresis loop can be shaped as shown in Fig. 6*b* so that with switch S closed the flux variations and consequently the voltage across the output terminals of the output windings can practically be reduced to zero. Extremely suitable for this purpose is the use of a plate of the same material as that of plates 17 and 18 with magnetisation at right angles to the plate, vide Fig. 7. In this instance, the plate 23 consists of the same material as plates 17 and 18. Permanent magnets 24 and 25 serve to magnetise the plate 23. The hysteresis loop of the magnetic circuit comprising the plate 23 with permanent magnets 24, 25 is shown in Fig. 6*c*.

Figure 8:
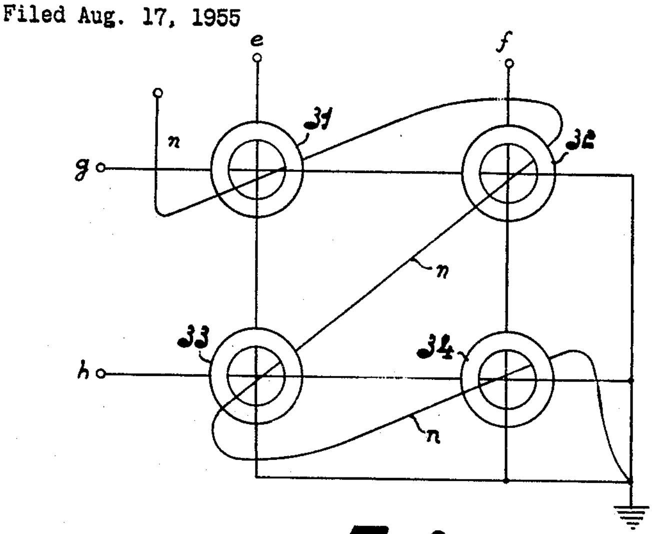
Fig. 8 depicts a memory matrix comprising known devices.

The invention is particularly advantageous if more than one core is used, for example in memory matrices. Fig. 8 shows such a memory matrix made up of known devices. The cores having a high remanence and a hysteresis loop in the form of a parallelogram are provided in rows and columns. Letting all the cores 31 to 34 to be in the state $\phi_1$ (Fig. 3*a*) the storing of a "1" characterized by the state $\phi_2$ in a given core is effected by supplying to each conductor coupled with said core a pulse of $\frac{1}{2}i_1$ (Fig. 3*a*). Thus, for example, in core 32 a "1" is stored by supplying a pulse to the conductors *f* and *g*. The cores 31 and 34 are energised by one pulse $\frac{1}{2}i_1$ which however, is just too small to effect a change-over from $\phi_1$ to $\phi_2$. The reading out is effected similarly to Fig. 3*a*, but now the reading-out pulse $i_1$ is formed by two pulses of $\frac{1}{2}i_1$ simultaneously occurring in two conductors. If, for example, the state of core 32 is to be determined pulses each having a value of $\frac{1}{2}i_1$ are required to be supplied to the conductor *f* and *g*. In accordance with the state of core 32 a large or a small voltage peak will occur across the common reading-out winding *n*.

Figure 9:
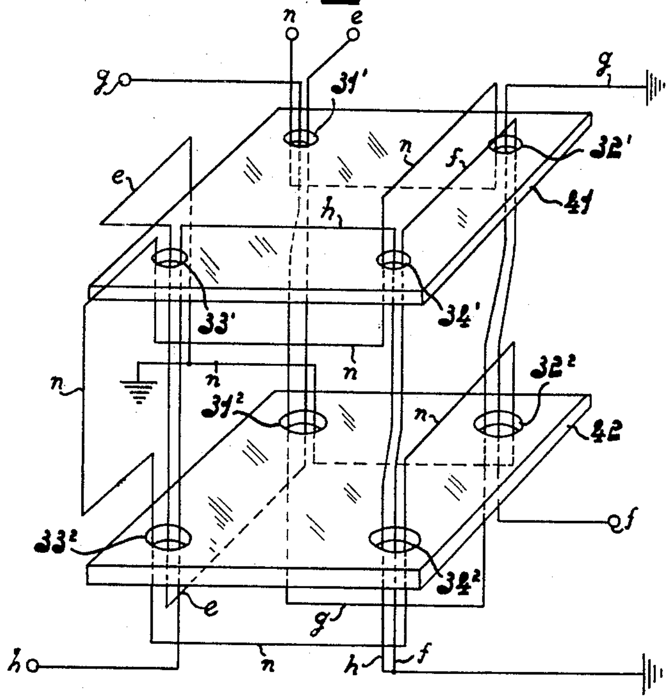
Fig. 9 shows a memory matrix comprising devices in accordance with the invention.

Fig. 9 shows a memory matrix comprising devices in accordance with the invention. In this instance the plates of the several devices are united to form two plates 41 and 42. Plate 41 is thinner than 42 to secure the aforesaid compensation of undesired output voltages as previously explained. Similar conductors shown in Figs. 9 and 8 bear the same references. Holes in the plates 41 and 42 associated to form the desired magnetic circuit are denoted by indexed numerals corresponding to the reference numerals of corresponding cores of the device shown in Fig. 8.

As against the disadvantage of the somewhat intricate wiring relative to that of the device shown in Fig. 8, the device depicted in Fig. 9 has the advantage of a considerably greater robustness. Also improved operation of the device can be obtained simply by utilising as explained above various plate thicknesses, hole sizes, different plate materials and suitable choice of the number of turns in the windings.

A laboratory model of such a memory matrix has been built, the magnetic circuit of which consised of two plates, both of manganese ferrite material. The thickness of the first plate was 3 mm., and the thickness of the second was 4.5 mm. The diameter of the holes in the first plate was 3 mm., and the diameter of the holes in the second plate was 4 mm. The distance between the centres of two adjacent holes in both plates was 7.5 mm. The number of input windings for each hole in the first plate was equal to the number of input windings for each hole in the second plate. This number equaled 8, 4 for each row, and 4 for each column. The number of output windings, as well for the first plate as for the second plate was 10. $i_1$ in this case was 2 amp.

What is claimed is:

1. A magnetic device of the switching type comprising a pair of separate, generally plate-shaped members constituted of ferromagnetic material having a high remanence and a substantially parallelogram-shaped hysteresis loop, said plate-shaped members each having an aperture and the aperture in one member being of a size different from the aperture in the other member, an input winding threading different-sized apertures in both plate-shaped members in the same sense so that the magnetic coupling of the input winding to both plate-shaped members in a serial coupling, and an output winding threading the said apertures in both members in the opposite sense so that the voltages induced therein by fluxes in each plate-shaped member are in opposition, whereby the resultant magnetic circuit exhibits improved magnetic characteristics.

2. A magnetic device as set forth in claim 1 wherein the plate-shaped member having the larger-sized aperture also has a greater thickness than the other plate-shaped member.

3. A magnetic device as set forth in claim 1 wherein a control winding threads apertures in both plate-shaped members in the same sense for controlling the degree of saturation of the magnetic members.

4. A magnetic device of the switching type comprising a pair of separate, generally plate-shaped members of extended surface area and constituted of ferromagnetic material having a high remanence and a substantially parallelogram-shaped hysteresis loop, one of said members having plural apertures of small diameter, the other member having plural apertures of larger diameter, an input winding threading smaller and larger apertures in both plate-shaped members in the same sense so that the magnetic coupling of the input winding to both plate-shaped members is a serial coupling, and an output winding threading the said smaller and larger apertures in both members in the opposite sense so that the voltages induced therein by fluxes in each plate-shaped member are in opposition, whereby the resultant magnetic circuit exhibits improved magnetic characteristics.

5. A magnetic device as set forth in claim 4 wherein the said other member has a greater thickness than said one member.

6. A magnetic device of the switching type comprising three separate, generally plate-shaped members constituted of ferro-magnetic material having a high remanence and a substantially parallelogram-shaped hysteresis loop, said three plate-shaped members each having an aperture and the aperture in one of the members being of a size different from the aperture in another of the members, an input winding threading apertures in all three plate-shaped members in the same sense so that the magnetic coupling of the input winding to the plate-shaped members is a serial coupling, and an output winding threading the said apertures in all three members but the different-sized apertures in two of the members in the opposite sense so that the voltages induced therein by fluxes in the associated plate-shaped members are in opposition, whereby the resultant magnetic circuit exhibits improved magnetic characteristics.

7. A device as set forth in claim 6 wherein means are provided for magnetizing one of the plate-shaped members at right angles to its plane.

References Cited in the file of this patent

UNITED STATES PATENTS

| | | |
|---|---|---|
| 2,666,151 | Rajchman | Jan. 12, 1954 |
| 2,724,103 | Ashenhurst | Nov. 15, 1955 |
| 2,732,542 | Minnick | Jan. 24, 1956 |
| 2,781,503 | Saunders | Feb. 12, 1957 |

OTHER REFERENCES

"Nondestructive Sensing of Magnetic Cores," by D. A. Buck and W. I. Frank, page 110, "Electrical Engineering," February 1954.